United States Patent [19]

Scarsella et al.

[11] 4,072,765

[45] Feb. 7, 1978

[54] METHOD OF MAKING AN EXTRACTABLE COFFEE SUBSTITUTE

[75] Inventors: Edward Louis Scarsella, Bedford Hills, N.Y.; Clifford Henry Spotholz, Montvale, N.J.

[73] Assignee: General Foods Corporation, White Plains, N.Y.

[21] Appl. No.: 707,738

[22] Filed: July 21, 1976

[51] Int. Cl.$^2$ .............................................. A23F 1/16
[52] U.S. Cl. ..................................... 426/596; 426/595
[58] Field of Search ................................ 426/596, 595

[56] References Cited

U.S. PATENT DOCUMENTS

| 1,031,962 | 7/1912 | Post | 426/596 |
|---|---|---|---|
| 1,119,849 | 12/1914 | Malcolm | 426/596 |
| 1,165,415 | 12/1915 | Kellogg | 426/596 |
| 1,177,038 | 3/1916 | Kellogg | 426/596 |
| 1,204,358 | 11/1916 | Kellogg | 426/596 |
| 1,631,829 | 6/1927 | Negly | 426/596 |
| 2,379,427 | 7/1945 | Fetzer | 426/432 X |
| 2,380,092 | 7/1945 | Weisberg | 426/596 |

FOREIGN PATENT DOCUMENTS

| 24,674 | 6/1919 | Denmark | 426/596 |
|---|---|---|---|
| 340,091 | 4/1936 | Italy | 426/596 |
| 131,304 | 11/1920 | United Kingdom | 426/596 |
| 24,706 of | 1895 | United Kingdom | 426/596 |
| 1,568 of | 1881 | United Kingdom | 426/596 |
| 339,821 | 12/1930 | United Kingdom | 426/596 |
| 5,122 of | 1895 | United Kingdom | 426/596 |
| 28,708 of | 1896 | United Kingdom | 426/596 |
| 349 | 4/1916 | United Kingdom | 426/596 |
| 1,990 of | 1899 | United Kingdom | 426/596 |

OTHER PUBLICATIONS

American J. of Pharmacy, 4th series, vol. 28, 1899.

*Primary Examiner*—Steven L. Weinstein
*Attorney, Agent, or Firm*—Thomas R. Savoie; Bruno P. Struzzi

[57] ABSTRACT

Coffee-like beverages are prepared by brewing a composition containing on a weight basis from 40 to 60% roasted coffee, 35 to 55% roasted and comminuted wheat and from 3 to 6% hydrolyzed starch material having a D.E. of from 5 to 19.

2 Claims, No Drawings

METHOD OF MAKING AN EXTRACTABLE COFFEE SUBSTITUTE

BACKGROUND OF THE INVENTION

Hot coffee beverages are widely consumed throughout the world and are generally prepared from roasted coffee alone or in combination with such other roasted plant material such as chicory. It has been found that the majority of consumers who are used to the taste imparted by beverages prepared by brewing 100% coffee material do not find the taste of beverages prepared from composites of coffee and other extractable materials to be acceptable. A large number of these consumers would be desirous of purchasing brewable beverage compositions which could be priced significantly less than 100% roasted coffee products and which might also contain significantly lower amounts of caffeine than pure coffee products, provided these compositions could yield a brewed beverage closely resembling brewed coffee.

Prior attempts to combine roasted coffee with significant amounts of roasted cereal grains have resulted in brewed beverages which have unacceptable high levels of cereal taste notes. It would, therefore, be desirable if a product could be formulated which could combine roasted coffee with relatively low-cost roasted cereal material and which would not yield a cereal note on brewing. This would be particularly desirable if this result could be effected without resort to synthetic flavor materials.

SUMMARY OF THE INVENTION

The aroma and flavor of beverages prepared from brewable compositions containing from 40 to 60% by weight, preferably about 40 to 50%, roasted and comminuted coffee and from 35 to 55% by weight, toasted wheat is unexpectedly made considerably more coffee-like by the addition to the composition of from 3 to 6%, preferably about 3.5 to 4.5%, of hydrolyzed starch material having a dextrose equivalent (D.E.) of from 5 to 19, and preferably from 10 to 15. The coffee-like character of the brewed beverage can be optimized by the use of dark roasted and fine ground coffee and light roasted and coarser ground wheat components.

It may also be desirable to increase the soluble solids level within the brewed beverage by incorporating a low, for example up to 3.5% by weight, preferably less than about 2.5%, level of a soluble cereal-based and/or coffee-based component. Suitable materials would be the dried water extract of a roasted mixture of cereal and saccharides and spray dried or freeze dried coffee powder.

It may also be desirable, to meet the particular taste preferences of selected consumers, to incorporate into the product minor amounts, for example up to about 8% by weight of vegetable materials such as the roasted peaches of U.S. Pat. No. 1,161,925, the roasted chicory of U.S. Pat. No. 1,147,888, the roasted rice or sweet potatoes of U.S. Pat. No. 1,119,849 or the roasted prunes or figs of W. H. Post U.S. Pat. Nos. 1,067,938 and 1,064,767, respectively.

DESCRIPTION OF THE PREFERRED EMBODIMENT

According to one embodiment of this invention, a high quality roasted coffee blend, preferably containing at least about 60% high-grade, Arabica coffees such as Colombian Milds, and Washed Central Americans and up to 30% low-grade coffees such as Robustas coffees is processed to achieve a dark roast color and a fine grind or particle size as compared to regular roasted and ground coffee products. Preferably the distinct coffee type wll be roasted separately in one or more separate fractions with the roasted beans then being blended together and ground or otherwise comminuted. It would be possible, however, to blend the various coffees either before roasting or after grinding.

Desirably, the high-grade coffees will be roasted to a darker roast color than the low-grade coffees in order to heighten the flavor contribution of these coffees; however, all of the coffees present in the composition of this invention should possess a relatively dark roast color so that a high amount of coffee aromas and flavors are developed. A typical coffee blend will employ about 75 to 85% by weight high-grade Arabica coffee having an average roast color in the range of 40 to 55 and about 15 to 25% of Robustas coffee at a lighter roast color of about 45 to 60. As a further step to increase the flavor contribution of the roasted coffee component, the roasted coffee beans are ground to a relatively small particle size, preferably corresponding to drip grind coffee generally recognized as possessing an average particle size of about 0.75 mm. Compression or flaking of the roasted coffee either before or after grinding may also be employed in order to increase the amount of soluble solids which are readily extracted from the coffee during a conventional brewing cycle.

The roasted and comminuted wheat component is processed so as to minimize its flavor contribution to the resulting brewed beverage. The wheat, which may be any available type of raw wheat, such as soft red winter sheat, durum wheat, hard red spring wheat, is roasted to a very light roast color in excess of 85 and preferably to about 95 and is then ground or otherwise subdivided to a coarse particle size comparable to a grind size characterized in the coffee art as percolator grind (i.e., used in the production of soluble coffee) and generally recognized as having an average particle size of about 1.5 mm. Preferably, the minus 40 U.S. mesh (0.42 mm) fraction of the thus ground wheat will be removed in order to reduce the level of readily extractable cereal solids present.

The roasting practiced in accordance with the invention is expressed herein by a color number which is a measure of the percent light reflected from a roasted and ground coffee reference to a color standard. The higher the number, the higher will be the percent light reflected and the lighter the roast color. In general, the coffee will be roasted and quenched to a color consistent with an empirically derived terminal roast temperature, the latter being a function of roast equipment and operating conditions thereof. Generally, the coffee will be separately roasted atmospherically in a solid, cylindrical roaster and quenched by conventional techniques such as cool air, water sprays, or a combination thereof.

The color of coffee is determined by fine grinding aircooled roasted coffee and screening it though a U.S. #50 sieve using a Ro-tap Testing Sieve Shaker, the hammer thereof operating for 3 minutes. The portion that passes through U.S. #50 and is retained on the pan is collected, placed in a container of 1¾ inch diameter and ½ inch deep and pressed under 1500 psi by a 1⅜ inch ram for 5 seconds. The pressed coffee is placed beneath a photoelectric search unit of a color measuring device.

The color measuring device is a photoelectric reflection model 610 having a model y10-Y search unit, manufactured by Photovolt Company. The device transmits light from an incandescent bulb through a tri-stimulus filter (595mu) onto the surface of the pressed sample. The reflected light is detected by the device's sensing means. A standard color plate is employed as a typical reference. It has a brown color and hue. The standard brown plate exhibits the following reflection curve using a magnesium oxide block to represent 100% reflection.

| Reflectance | |
|---|---|
| Wave Length mu | Percent Reflection % |
| 580 | 14.0 |
| 600 | 17.0 |
| 620 | 21.4 |
| 650 | 26.0 |
| 700 | 24.3 |

The reflectance device aforesaid is adjusted to match the precent reflectance of the color standard from an incandescent bulb. The device was adjusted on a 0–100 scale (0 being no reflectance) to an arbitrarily assigned reading of 86.5 for reference to the color standard. Thus a color reading of 40 would signify the number unit comparison of reflected filtered light relative to the aforesaid brown color standard referred to a reading on the device.

The hydrolyzed starch materials suitable for use in this invention are dextrin materials, possessing a D.E. of from 5 to 19. These dextrins are conventionally prepared via the enzymatic or acid hydrolysis of starch and are commercially available under a variety of trade names. Typically corn syrup solids having a D.E. of from 10 to 15 will be employed.

As previously mentioned, dried cereal extracts, such as the dried extract from a roasted and carmelized mixture of wheat, bran and molasses commercially available under the trademark "Instant Postum", or soluble coffee solids may be used alone or in combination to provide an added level of soluble solids and body to the brewed beverage.

This invention is further described but not limited by the following examples:

EXAMPLE

A roasted coffee blend containing 55 parts Colombian Milds type coffees having an average roast color 38, 25 parts washed Central American coffees having a roast color of 55 and 20 parts of Robustas coffee having a roast color of 47 was prepared and then ground in a conventional coffee mill set for production of a drip grind.

Soft red winter wheat was roasted to a roast color of 95 and this roasted grain was coarsely ground by means of a compaction mill with a 0.52 to 0.70 inch roll spacing. This ground material was then screened to remove particles smaller than 40 U.S. mesh.

Using the above prepared components, the following two compositions are prepared in identical manners, all values being given on a predent weight basis:

| | A | B |
|---|---|---|
| R&G Coffee | 51.2 | 51.2 |
| R&G Wheat | 44.4 | 42.2 |
| Hydrolyzed Starch 10 D.E. (Frodex - corn syrup solids) | — | 4.4 |
| Roasted Cereal-Molasses Extract (Instant Postum) | 4.4 | 2.2 |

Compositions A and B are separately, but identically, brewed in electric coffee percolators and the resulting beverages evaluated for flavor and aroma. Both expert and consumer evaluations result in a significant preference for sample B, as a result of a reduced burnt cereal note, over sample A.

Having thus described the invention, what is claimed is:

1. A method of making an extractable beverage composition by combining on a weight basis:
    a. 35 to 55% roasted and comminuted raw wheat,
    b. 40 to 60% roasted and comminuted coffee, said coffee containing at least 60% high-grade, Arabica coffees and said coffee being roasted to a darker color and comminuted to a finer particle size than the roasted and comminuted wheat of a), and
    c. 3 to 6% of an acid or enzymatically hydrolysed starch material having a D.E. of from 5 to 19.

2. The method of claim 1 wherein the composition consists of the roasted wheat, roasted coffee and hydrolyzed starch components.

* * * * *

UNITED STATES PATENT AND TRADEMARK OFFICE
CERTIFICATE OF CORRECTION

PATENT NO. : 4,072,765
DATED : February 7, 1978
INVENTOR(S) : Edward Louis Scarsella et al.

It is certified that error appears in the above-identified patent and that said Letters Patent are hereby corrected as shown below:

In column 1, line 37, change "toasted" to -- roasted -- .

In column 2, line 36, change "sheat" to -- wheat --; line 50, change "reference" to -- referenced --; line 61, change "though" to -- through --.

In column 3, line 24, change "precent" to -- percent --; line 47, change "examples" to -- example --.

In column 4, line 5, before "38" insert -- of --; line 17, change "predent" to -- percent --.

Signed and Sealed this

Twenty-seventh Day of June 1978

[SEAL]

Attest:

RUTH C. MASON
Attesting Officer

DONALD W. BANNER
Commissioner of Patents and Trademarks